United States Patent
Nishimi et al.

(10) Patent No.: US 8,100,798 B2
(45) Date of Patent: Jan. 24, 2012

(54) ELEMENT OF BELT FOR CONTINUOUSLY VARIABLE TRANSMISSION AND BELT FOR CONTINUOUSLY VARIABLE TRANSMISSION

(75) Inventors: Hideyuki Nishimi, Nisshin (JP); Shinya Kuwabara, Susono (JP)

(73) Assignee: Toyota Jidosha Kabushiki Kaisha, Tokyo-shi (JP)

( * ) Notice: Subject to any disclaimer, the term of this patent is extended or adjusted under 35 U.S.C. 154(b) by 0 days.

(21) Appl. No.: 12/866,782

(22) PCT Filed: Feb. 12, 2009

(86) PCT No.: PCT/JP2009/052264
§ 371 (c)(1),
(2), (4) Date: Aug. 9, 2010

(87) PCT Pub. No.: WO2009/101950
PCT Pub. Date: Aug. 20, 2009

(65) Prior Publication Data
US 2010/0311531 A1    Dec. 9, 2010

(30) Foreign Application Priority Data
Feb. 15, 2008 (JP) ................................ 2008-035205

(51) Int. Cl.
*F16G 1/22* (2006.01)
(52) U.S. Cl. .................... 474/242; 474/244; 474/245
(58) Field of Classification Search .............. 474/242, 474/244–245
See application file for complete search history.

(56) References Cited

U.S. PATENT DOCUMENTS

| 4,303,403 | A  | 12/1981 | Lamers |
| 6,676,553 | B2 | 1/2004 | Van Lith et al. |
| 6,857,980 | B2 * | 2/2005 | van Liempd et al. ......... 474/242 |
| 7,029,411 | B2 * | 4/2006 | Van Lith et al. ............. 474/201 |
| 7,282,002 | B2 * | 10/2007 | Kanehara et al. ............. 474/242 |
| 7,294,077 | B2 * | 11/2007 | Wang et al. ................. 474/201 |
| 2001/0056002 | A1 * | 12/2001 | Van Lith et al. ............. 474/242 |

(Continued)

FOREIGN PATENT DOCUMENTS
JP     55 100443    7/1980
(Continued)

OTHER PUBLICATIONS

Extended European Search Report issued Sep. 5, 2011, in European Patent Application No. 09710553.

*Primary Examiner* — Sang Kim
(74) *Attorney, Agent, or Firm* — Oblon, Spivak, McClelland, Maier & Neustadt, L.L.P.

(57) ABSTRACT

A belt for a continuously variable transmission and elements used in the belt. The elements include a stopper portion formed integrally with a neck portion erected upwardly from a saddle face to hold a width end portion of the ring. The elements are juxtaposed annularly in a same orientation and fastened by rings disposed on a saddle face of the element thereby forming a belt for a continuously variable transmission. A recessed portion is formed by depressing the saddle face at a corner between a side face of the neck portion and the saddle face; and an inner face of the recessed portion includes a first inner face extending smoothly into the side face of the neck portion and having a relatively larger curvature radius, and a second inner face extending smoothly into the first inner face and having a relatively smaller curvature radius.

8 Claims, 2 Drawing Sheets

U.S. PATENT DOCUMENTS

2002/0032090 A1* 3/2002 Van Lith et al. ............... 474/242
2002/0187868 A1* 12/2002 Liempd et al. ................ 474/242
2005/0003917 A1 1/2005 Kanehara et al.

FOREIGN PATENT DOCUMENTS

| JP | 62 125118 | 6/1987 |
| JP | 1 128045 | 8/1989 |
| JP | 2002 39280 | 2/2002 |
| JP | 2003 269546 | 9/2003 |
| JP | 2005 24043 | 1/2005 |
| JP | 2005 273806 | 10/2005 |
| JP | 2006 9950 | 1/2006 |
| WO | 2008/031713 A1 | 3/2008 |

* cited by examiner

ELEMENT OF BELT FOR CONTINUOUSLY VARIABLE TRANSMISSION AND BELT FOR CONTINUOUSLY VARIABLE TRANSMISSION

TECHNICAL FIELD

This invention relates to a belt to be applied to grooves of pulleys to transmit a torque, and to an element to be used to form the belt.

BACKGROUND ART

A belt formed by juxtaposing a plurality of metal pieces called an "element" or a "block" in a circular manner, and by fastening the juxtaposing metal pieces by a metal belt member called a "ring" or a "hoop" is known in the prior art to be used in a continuously variable transmission. The belt of this kind is adapted to transmit the torque by a pushing force among the metal pieces thus juxtaposed to be contacted to one another. Specifically, the metal pieces existing in the groove of a drive pulley are sequentially pushed out of the groove by a rotation of the pulley while pushing the metal pieces in front of those metal pieces. The metal pieces thus being pushed forward are eventually entered into a groove of a driven pulley. As a result, the torque of the drive pulley is transmitted to the driven pulley by such advancement of the metal pieces.

An example of the belt thus structured is disclosed in Japanese Patent Laid-Open No. 2002-39280. The driving belt taught by Japanese Patent Laid-Open No. 2002-39280 comprises a transverse element, and both side faces thereof are to be contacted with pulleys in case the driving belt is disposed between the pulleys. The transverse elements are fastened by two endless rings functioning as a band package. Therefore, the transverse element consists of: a first part, which extends under band package, and which is clamped by the pulleys; a second part, which is erected in the width center of the first part to protrude upwardly; and a third part, which extends transversely from the upper end of the second part. Namely, the first part serves as a main body comprising a saddle face on which the ring is disposed, the second part serves as a neck portion protruding upwardly from the saddle face, and the third part serves as a stopper portion covering the saddle face partially from above. In addition, the transverse element taught by Japanese Patent Laid-Open No. 2002-39280 further comprises recessed portions formed by rounding both of the side faces of the neck portions toward the width center. According to the teachings of Japanese Patent Laid-Open No. 2002-39280, such recessed portion is formed to prevent interference between the lateral end of the ring and the neck portion, and stress concentration on those portions. For this purpose, a concave curvature of the inside surface of the recessed portion is rounded to be constant.

The recessed portion of the belt taught by Japanese Patent Laid-Open No. 2002-39280 is thus formed to prevent the stress concentration. For this purpose, the radius of the concave curvature of the inside surface has to be enlarged according to the envisaged stress. That is, in order to relaxing such stress concentration certainly, the curvature radius of the recess has to be enlarged. However, according to the teachings of Japanese Patent Laid-Open No. 2002-39280, the recessed portion is formed on both sides of the neck portion by rounding from an innermost portion of the saddle face to an innermost portion of a lower face of the stopper portion through the side face of the neck portion. Therefore, if the curvature radius of the recess is enlarged, a width of the neck portion is thereby narrowed.

In order to avoid the above-explained disadvantage, it may be possible to enlarge the curvature radius of the recess while keeping sufficient width of the neck portion. In this case, however, a total width of the element has to be widened to ensure sufficient widths of the saddle faces and the stopper portion. As a result, the belt has to be enlarged entirely. Thus, according to the structure taught by Japanese Patent Laid-Open No. 2002-39280, it would be difficult to relax the stress concentration if the curvature radius of the recess is reduced for the purpose of avoiding enlargement of the element. In other words, it is inevitable for the element taught by Japanese Patent Laid-Open No. 2002-39280 to be enlarged if the durability of the element is enhanced while relaxing the stress concentration.

As described, according to the teachings of Japanese Patent Laid-Open No. 2002-39280, the third part serves as a stopper portion for preventing disengagement of the rings from the element by holding the rings from above. For example, the upper face of the ring is contacted strongly with the stopper portion in case the element is getting out of the groove of the pulley. In this case, bending load may be applied to the second part functioning as a neck portion. However, Japanese Patent Laid-Open No. 2002-39280 fails to disclose a countermeasure against such bending load to improve strength or durability of the element.

DISCLOSURE OF THE INVENTION

The present invention has been conceived noting the technical problems thus far described, and its object is to provide a belt for a continuously variable transmission, and to improve a strength or durability of an element used in the belt without enlarging the element. More specifically, an objective of the present invention is to enhance a strength or durability of the element and the belt using the element by relaxing stress concentration on a base portion of a neck portion of the element.

In order to achieve the above-mentioned object, according to the present invention, there is provided an element of a belt for a continuously variable transmission, which is juxtaposed annularly in a same orientation and fastened by a ring disposed on a saddle face of the element, and which has a stopper portion formed integrally with a neck portion erected upwardly from the saddle face to hold a width end portion of the ring, characterized in that: a recessed portion is formed by depressing the saddle face at a corner between a side face of the neck portion and the saddle face; and an inner face of the recessed portion comprises a first inner face extending smoothly into the side face of the neck portion and having a relatively larger curvature radius, and a second inner face extending smoothly into the first inner face and having a relatively smaller curvature radius.

According to another aspect of the present invention, there is provided a belt for a continuously variable transmission, in which an element comprises a saddle face on which a ring is disposed, a neck portion erected upwardly from the saddle face, and a stopper portion formed integrally with the neck portion to hold a width end portion of the ring disposed on the saddle face, and in which a plurality of the elements are juxtaposed annularly in a same orientation and fastened by the ring disposed on the saddle face, characterized in that: the element comprises a recessed portion formed by depressing the saddle face at a corner between a side face of the neck portion and the saddle face; and an inner face of the recessed portion comprises a first inner face extending smoothly into the side face of the neck portion and having a relatively larger curvature radius, and a second inner face extending smoothly into the first inner face and having a relatively smaller curvature radius.

According to the element of the present invention and the driving belt using the same, the width end portion of the ring fastening the elements is thus inserted into a space between the saddle face and the stopper portion. Therefore, the elements can be prevented from moving relatively toward the outer circumferential side of the ring. Moreover, even in case a load is applied to the element in a direction to move the element relatively toward the inner circumferential side of the ring, the stopper portion is contacted with the ring to prevent such relative movement of the element. In this case, a load is generated to push the stopper portion in the direction opposite to the saddle face, and a resultant bending load is applied to the neck portion. Especially, the maximum bending load is applied to the base portion of the neck portion, that is, to the corner between the neck portion and the saddle face. In addition, a load is applied to both lateral faces of the element in the traveling direction of the belt as a result of transmitting the torque between the pulleys and the element, and a load in the opposite direction is applied to the saddle face. Consequently, the element is subjected to a bending stress in the thickness direction thereof, and especially, such stress is applied significantly to the border between the saddle face and the neck portion at which the cross-sectional area is changed. Therefore, as described, the recessed portion is formed on the aforementioned corner at which the bending stress is applied. Specifically, the curvature radius of the inner face of the recessed portion is relatively larger at the portion extending into the side face of the neck portion, and relatively smaller at the portion extending thereto, that is, at the saddle face side. For this reason, stress concentration factor is reduced relatively at the base portion of the neck portion so that the strength and the durability of the neck portion can be enhanced without thickening the neck portion itself or without widening the width of the neck portion.

BEST MODE FOR CARRYING OUT THE INVENTION

Figure 4:
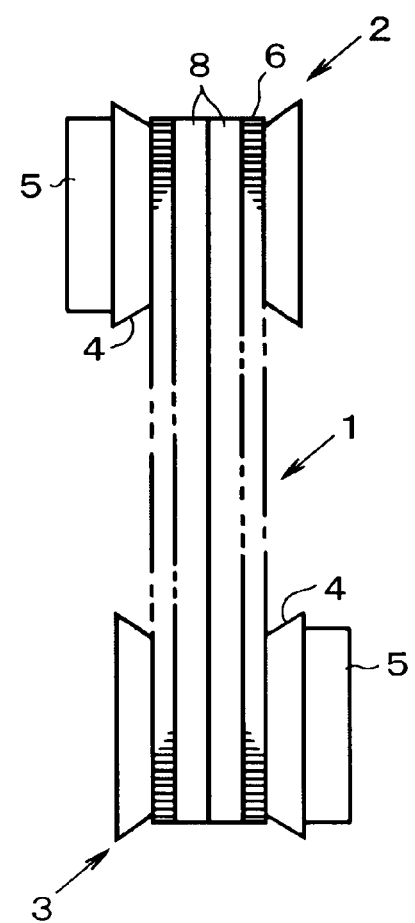
FIG. 4 is a view schematically showing a continuously variable transmission to which the belt of the present invention is applied.

Next, examples of the present invention will be explained hereinafter. A belt to which the present invention is applied is adapted to be used in a continuously variable transmission. Specifically, a groove whose cross-sectional shape is V-shaped is formed on an outer circumference of the pulley of the continuously variable transmission, and the belt is applied to the groove of the pulley for the purpose of transmitting torque by a frictional force between the belt and pulleys. For example, as schematically shown in FIG. 4, a belt 1 is applied to a drive pulley 2 and a driven pulley 3 of the continuously variable transmission. Each pulley 2 and 3 comprises a pair of fixed sheave and movable sheave individually having a tapered face and being opposed to each other. Therefore, V-shaped groove 4 is formed between those sheaves, and a width of the groove 4 is varied by reciprocating the movable sheave by an actuator 5 such as hydraulic cylinder.

Figure 2:
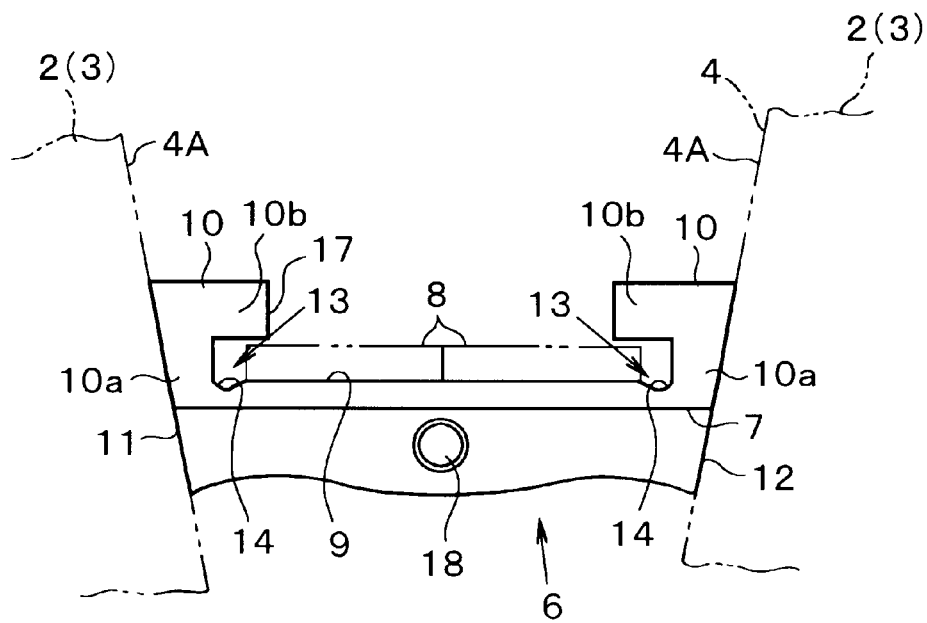
FIG. 2 is a front view showing one example of the element according to the present invention.

The belt 1 thus used is formed by fastening a plurality of elements in a circular manner by a ring, and both side faces or lateral faces thereof are tapered to be V-shaped. FIG. 2 shows an example of an element 6 used in the belt 1 shown in FIG. 4. Specifically, the element 6 is a plate-like member made of metal, and the elements 6 of same configuration and same dimensions are juxtaposed annularly in the same orientation. Therefore, some of the elements 6 are inevitably juxtaposed not parallel to one another, in other words, some of the elements 6 being juxtaposed are inevitably spread like a fan (i.e., radially) around a center of curvature of the belt 1.

In order to allow the elements 6 thus oscillated in a fan-like fashion to be contacted with one another, a rocking edge 7 is formed on the element 6. Specifically, the rocking edge 7 is a boundary or a boundary area at which the thickness of the element 6 is changed, and the rocking edge 7 is formed at a substantially center of the element 6 in the height direction while extending in a width direction of the element 6 (i.e., in a direction parallel with a rotational center axis of the pulley). In case the belt 1 is applied to the pulleys, a circumferential length of an array of the elements 6 is longer at an upper portion of the element 6 (that is, at an outer circumferential side of the belt 1). Therefore, clearances between elements 6 around the pulley are widened at the upper portion thereof. To the contrary, the circumferential length of the array of the elements 6 is shorter at a lower portion of the element 6 (that is, at an inner circumferential side of the belt 1). Therefore, the clearances between the elements 6 are narrowed at the lower portion thereof. For this reason, a thickness of the lower portion of the element 6 is reduced gradually toward a lower end thereof, and the portion at which the thickness of the element 6 is thus changed serves as the rocking edge 7. Thus, the element 6 is allowed to oscillate with respect to the rocking edge 7 to spread in the fan-like fashion, that is, a pitching of the elements 6 is allowed by the rocking edge 7. In addition, the rocking edge 7 is necessary to be formed only on one of the faces of the element 6.

The element 6 further comprises a saddle face 9 on which a ring 8 is disposed (or arranged). Since the ring 8 fastening the elements 6 is thus contacted with the saddle face 9, a contact pressure between the ring 8 and the saddle face 9 is increased in case the belt 1 is transmitting the torque. Meanwhile, when the elements 6 moving ahead in the straight region enter into the groove of the pulleys 2 or 3 and oscillated in the fan-like fashion, the ring 8 slides on the saddle face 9 and this will result in a generation of large frictional force. Therefore, in order not to increase a moment resulting from such frictional force, the saddle face 9 is formed on a portion close to the rocking edge 7 as much as possible. More specifically, as shown in FIG. 2, the thickness of the element 6 is thicker at the portion above the saddle face 9 and thinner at the portion below the saddle face 9. That is, the rocking edge 7 is formed at the level of the saddle face 9 in the width direction of the element 6, or at the level slightly below the saddle face 9. Thus, the saddle face 9 is formed at a substantially intermediate portion (or center portion) in the height direction of the saddle face 9.

The ring 8 of the belt 1 is formed by accumulating thin metal layers, and disposed on the saddle face 9 to fasten the array of the elements 6. In the example shown in FIG. 2, two rows of the rings 8 are arranged parallel to each other on the saddle face 9. However, the number of the ring 8 should not be limited to the example shown in FIG. 2, and for example, a single ring 8 may also be used to fasten the elements 6. In the example shown in FIG. 2, a width of the saddle face 9 is wider than a total width of the rings 8 arranged parallel to each other.

According to the present invention, the ring 8 is disposed on the saddle face 9 to fasten the element array in the circular manner and to hold the elements 6 not to deviate outwardly in the radial direction. However, in addition to the above-mentioned functions, the ring 8 also functions to draw the elements 6 being discharged from the groove of the pulley 2 or 3. For this purpose, in order to prevent the ring 8 from deviating radially outwardly from the elements 6, a hook portion is formed to hold the ring 8 in the space between the hook portion and the saddle face 9.

In the example shown in FIG. 2, a hook portion 10 is erected respectively on both width ends of the element 6 while extending upwardly and covering the saddle face 9 partially from above. As shown in FIG. 2, the hook portion 10 comprises a neck portion 10a extending from the saddle face 9 upwardly in FIG. 2, and a stopper portion 10b extending from the neck portion 10a toward the width center of the element 6 to cover the width end portion of the saddle face 9. Thus, the hook portion 10 is adapted to hold both of the width end portions of the ring 8 loosely in the clearances between the saddle face 9 and the stopper portions 10b.

In case a load is applied to the stopper portion 10b upwardly in FIG. 2, a boundary portion between the stopper portion 10b and the neck portion 10a, and a base portion of the neck portion 10a are subjected to a bending stress. In case the element 6 shown in FIG. 2, a width of the neck portion 10a between the lateral face 11 (or 12) as a torque transmission face and the saddle face 9 is especially narrowed at the base portion thereof. The base portion of the neck portion 10a thus narrowed is subjected to the bending stress resulting from pushing the stopper portion 10b upwardly, and to a bending stress resulting from a bidirectional loads in the thickness direction of the element 6 derived from the pulley 2 (or 3) and the ring 8. In addition, since the lateral faces of the neck portion 10a and the stopper portion 10b are contacted with an inner face 4A of the groove 4 to serve as torque transmission faces, the neck portion 10a and the stopper portion 10b are subjected to the bending load to be bent toward the width center of the element 6. As a result, significant bending stress is applied to the base portion of the neck portion 10a. Such bending stress acts as a tensile stress or a compressive stress on the corner 13 between a side face of the neck portion 10a and the saddle face 9. Therefore, as shown in FIG. 1, a recessed portion 14 is formed to prevent a concentration of those stresses on the corner 13 thereby enhancing the durability of the element 6.

Figure 1:
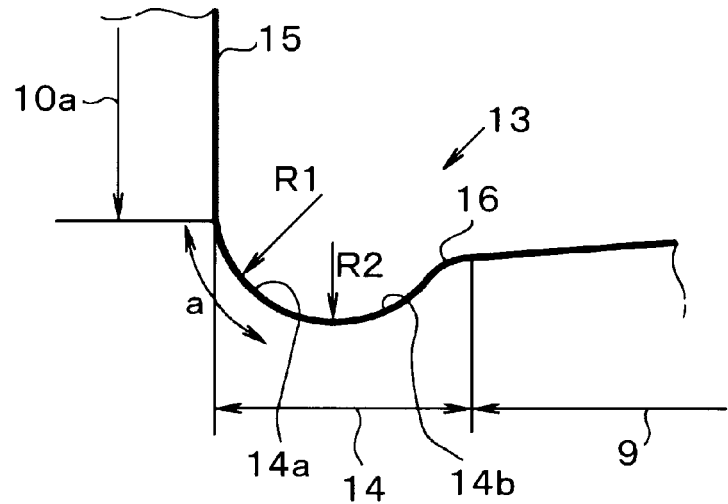
FIG. 1 is a view partially showing one example of a configuration of the recessed portion according to the present invention.

In FIG. 1, a left corner 13 (in FIG. 2) between a side face 15 of the neck portion 10a and the saddle face 9 is shown in an enlarged scale. The recessed portion 14 is formed by depressing the saddle face 9 at a portion adjacent to the base portion of the neck portion 10a. As shown in FIG. 1, an inner face of the recessed portion 14 is a curved face connecting the side face 15 of the neck portion 10a and the saddle face 9 smoothly. More specifically, a first inner face 14a of the neck portion 10a side is formed into a concave curve whose curvature radius R1 is relatively larger, and the first inner face 14a extends smoothly into the flat side face 15 of the neck portion 10a. That is, a tangent line of the first inner face 14a drawn to be contacted with the end portion of the first inner face 14a at the neck portion 10a side is congruent with the side face 15 of the neck portion 10a. Here, the first inner face 14a is formed within a region not to reach the bottom portion of the inner face of the recessed portion 14.

In addition, a second inner face 14b is extended from the first inner face 14a to form a bottom portion of the inner face of the recessed portion 14. The second inner face 14b is also a concave curve and a curvature radius R2 thereof is relatively smaller than that of the first inner face 14a. Those first inner face 14a and second inner face 14b are connected smoothly with each other, and tangent lines of those inner faces 14a and 14b are congruent with each other at a connected portion therebetween. An end portion of the second inner face 14b may be connected directly with the saddle face 9, however, in order not to create a sharp edge, the second inner face 14b is connected with the saddle face 9 through a convex curve 16. In addition, it is also possible to interpose a concave curve having much smaller curvature radius between the second inner face 14b and the convex curve 16.

According to the example, an originating point of the recessed portion 14 at the side of the neck portion 10a is situated at an intersection of an extension of the saddle face 9 with the side face 15 of the neck portion 10a, or situated in the vicinity of such intersection. Alternatively, in case the saddle face 9 is formed into a convex curve by applying a crowning thereto, the originating point of the recessed portion 14 at the side of the neck portion 10a is situated at an intersection of a plane passing through a top portion of the saddle face 9 with the side face 15 of the neck portion 10a, or situated in the vicinity of such intersection. According to the example, a prerequisite condition for the first inner face 14a is to have the curvature radius R1 which is larger than the curvature radius R2 of the second inner face 14b. Therefore, according to the example, the first inner face 14a includes a curved surface similar to a portion of an outline of an ellipse whose curvature radius is varied continuously, and a plane whose curvature radius is infinite. In addition, a forming range of the first inner face 14a is wider than a range in which a central angle at a center of curvature thereof is 45 degrees.

A clearance between leading end portion of the hook portion 10, that is, a clearance between the stopper portions 10b serves as an opening 17 to the saddle face 9. The clearance between the hook portions 10, in other words, an opening width of the saddle face 9 is wider than a width of one of the rings 8, but narrower than a total width of two rows of rings 8.

As described, the lateral faces 11 and 12 (i.e., flank faces) of the element 6 are contacted with an inner face 4A of the groove 4 of the pulley 2 (or 3) to transmit a torque. For this purpose, the lateral faces 11 and 12 are tapered to be parallel with the inner face 4A of the groove 4. In the example shown in FIG. 2, the reference numeral 18 represents a male connection as a protrusion formed on a front or rear face of the element 6 below the rocking edge 7, and a (not shown) female connection as a hole into which the male connection 18 is inserted loosely is formed on the opposite face. Therefore, the elements 6 can be arrayed by inserting the male connection 18 respectively into the female connection of adjoining element 6.

The elements 6 shown in FIGS. 1 and 2 are thus juxtaposed in the same orientation in a circular manner, and the two rows of rings 8 are inserted from the opening 17 to be disposed on the saddle face 9. As a result, the array of the elements 6 is fastened by the rings 8 in a circular manner. As shown in FIG. 4, the belt 1 thus assembled is applied to the grooves 4 of the pulleys 2 and 3 and clamped by the pulleys 2 and 3. When the drive pulley 2 is rotated, thrust force resulting from the rotation of the pulley 2 is applied to the elements 6 in the groove 4, and the elements 6 are thereby moved in the forward direction. Therefore, the element 6 in front of the elements 6 thus moved forward by the pulley 2 are pushed forward by the elements 6 thus moved forward. Meanwhile, the elements 6 in the groove 4 of the driven pulley 3 are pushed forward by the elements 6 behind them. As a result, the driven pulley 3 is pushed to be rotated by the elements 6 in the groove 4 thereof.

In case of thus transmitting the torque from the drive pulley 2 to the driven pulley 3 through the belt 1, a direction of the load acting between the pulley 2 (or 3) and the lateral face 11 (or 12) of the element 6 in the thickness direction (or a planner direction) of the element 6, and a direction of the load acting between the saddle face 9 and the ring 8 in the thickness direction (or a planner direction) of the element 6, are opposite to each other. Therefore, the element 6 is subjected to a bending stress to be bent in the planner direction thereof. In addition, the elements 6 in the groove 4 are clamped strongly by the pulley 2 (or 3). Therefore, the neck portion 10a is subjected to a load in a direction to be inclined inwardly (i.e., toward the width center of the element 6), and the base portion of the neck portion 10 is thereby subjected to a significant bending stress.

Moreover, at a position at which the belt 1 is driven in a tangential direction of the pulley 2 (or 3), in other words, at a point at which the element 6 in the groove 4 of the pulley 2 (or 3) is pushed out of the groove 4, the element 6 is still clamped by the pulley 2 (or 3) and kept rotated together with the pulley 2 (or 3). However, since the ring 8 extends in the tangential direction of the pulley 2 (or 3) at this point, the element 6 still being rotated by the pulley 2 (or 3) is stopped to be rotated by the outer circumferential face of the ring 8 at the hook portion 10 so that the element 6 is pulled out of the groove 4 by the ring 8. Therefore, in this situation, a load is applied to the hook portion 10 upwardly in FIG. 2, and the base portion of the neck portion 10a is thereby subjected to a significant bending stress.

However, the recessed portion 14 is formed at the corner 13 of the base portion of the neck portion 10a. As described, the recessed portion 14 is a rounded surface connecting the side face 15 of the neck portion 10a smoothly with the saddle face 9, therefore, the above-explained stress concentration at the corner 13 is relaxed by the recessed portion 14. Especially, the maximum bending stress derived from the load pushing the hook portion 10 upwardly and the maximum bending stress derived from the load pushing the neck portion 10a inwardly are applied to the base portion of the neck portion (i.e., to a region represented by "a" in FIG. 1). However, the first inner face 14a having a relatively larger curvature radius R1 is formed on the region "a". Therefore, the stress concentration on the corner 13 can be relaxed effectively. Thus, according to the present invention, strength of the element 6 or the belt 1 using the element 6 can be enhanced substantially without thickening or widening the neck portion 10a. That is, durability of the element 6 or the belt 1 can be enhanced without enlarging the element 6 or the belt 1.

As also described, the recessed portion 14 is formed without enlarging the curvature radius of the inner face of the recess 14 entirely. Specifically, the recessed portion 14 is formed by forming a curved surface of the larger curvature radius in a region of the neck portion 10a side, and by forming a curved surface of the smaller curvature radius in a region of the saddle face 9 side. Therefore, in addition to the above-explained advantage, the recessed portion 14 can be prevented from being enlarged entirely. For this reason, the width of the saddle face 9 can be ensured widely without widening the width of the element 6. Further, a deepness of the recessed portion 14 can be shallower by forming the first inner face 14a of the relatively larger curvature radius within a region not to reach the bottom of the inner face of the recessed portion 14. Therefore, the strength of the element 6 against the clamping pressure of the pulleys 2 and 3 can be prevented from being degraded.

Figure 3:
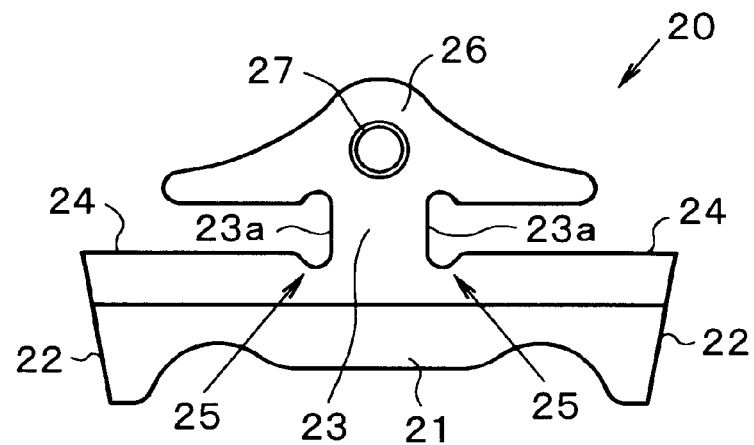
FIG. 3 is a front view showing another configuration of the element to which the present invention can be applied.

The present invention should not be limited to be applied to the element 6 shown in FIG. 2 and to the belt 1 using the element 6. For example, the present invention may also be applied to an element taught by Japanese Patent Laid-Open No. 2002-39280 in which the neck portion is erected on the width center of the element, and to a belt using this kind of element. Such another example of the element to which the present invention is applied is shown in FIG. 3. As shown in FIG. 3, an element 20 comprises a base 21 to be clamped by the pulley in a groove of the pulley, and both lateral faces (or flank faces) 22 thereof are respectively tapered to be parallel with each inner face of the groove. In the element 20, a neck portion 23 is erected on a width center of the base 21 to protrude upwardly in FIG. 3, and an upper face of the base 21 extending on both sides of the neck portion 23 serves as a saddle face 24.

In the element 20, the recessed portion 14 shown in FIG. 1 is formed on the base 21 at a corner 25 between the saddle face 24 and a side face 23a of the neck portion 23. Specifically, the recessed portion 14 comprises the first inner face 14a as a concave curve whose curvature radius R1 is relatively larger and which extends smoothly into the side face 23a of the neck portion 23, and the second inner face 14b as a concave curve whose curvature radius R2 is relatively smaller and which extends smoothly into the first inner face 14a. In addition, a top portion 26 extending transversely is formed integrally on an upper portion of the neck portion 23 to cover the saddle face 24 partially. Accordingly, the top portion 26 corresponds to the stopper portion of the present invention. In the element 20, a male connection 27 is formed on a width center of the top portion 26, and a (not shown) female connection as a hole is formed on the opposite face of the top portion 26.

In case the element 20 shown in FIG. 3 is used in a belt, the element 20 being moved forward in the groove of the pulley is also stopped to be rotated around the groove and pulled out of the groove by the ring at the top portion 26, when the element 20 is pushed out of the groove. Therefore, a bending load is applied to the neck portion 23 and a base portion of the neck portion 23 is thereby subjected to a significant bending stress. However, since the curvature radius of the first inner face 14a of the recessed portion 14 on the side of the neck portion 23 is increased, the stress concentration at the portion subjected to a significant bending stress can be relaxed or prevented. Therefore, the strength of the element 20 shown in FIG. 3 or the belt using the element 20 can be enhanced substantially without thickening or widening the neck portion 23 by thus applying the present invention to the element 20. As a result, durability of the element 20 or the belt can be enhanced without enlarging the element 20 or the belt.

The present invention should not be limited to the examples thus far explained. For example, the number of the rings for fastening the elements should not be limited to the two rings. Specifically, the element array may also be fastened by a single ring or three rows of the rings. In addition, although the metal layered ring as taught by Japanese Patent Laid-Open No. 2002-39280 is preferable to be used to fasten the element array, a single layered ring may also be used to fasten the element array. Further, the concave curve of the recessed portion is not necessarily to be formed only by the aforementioned first and second inner faces. For example, the concave curve of the recessed portion may also be formed into a rounded portion by smoothly connecting more than three concave curves having different curvature radii.

The invention claimed is:

1. An element of a belt for a continuously variable transmission, which is juxtaposed annularly in a same orientation and fastened by a ring disposed on a saddle face of the element, comprising:
   a stopper portion formed integrally with a neck portion erected upwardly from the saddle face to hold a width end portion of the ring, wherein:
   a recessed portion formed by depressing the saddle face at a corner between a side face of the neck portion and the saddle face,
   an inner face of the recessed portion includes a first inner face that extends from the side face of the neck portion to near a bottom portion of the recessed portion and having a first curvature radius, and a second inner face that extends from the first inner face toward the saddle face while forming the bottom portion and having a second curvature radius,
   the first curvature radius is larger than the second curvature radius, and
   the first inner face and the second inner face are concave.

2. The element of a belt for a continuously variable transmission according to claim 1, wherein:
   the neck portion extends upwardly from the saddle face at an end of the element in a width direction, and
   an inner face of the neck portion faces a center of the element in the width direction.

3. The element of a belt for a continuously variable transmission according to claim 2, wherein
   a stopper portion extends from the neck portion towards the center of the element in the width direction to cover a width-end portion of the saddle face.

4. The element of a belt for a continuously variable transmission according to claim 1, wherein
   the second inner face is connected to the saddle face through a convex curve.

5. A belt for a continuously variable transmission, comprising:
   an element including a saddle face on which a ring is disposed, a neck portion erected upwardly from the saddle face, and a stopper portion formed integrally with the neck portion to hold a width end portion of the ring disposed on the saddle face, and in which a plurality of the elements are juxtaposed annularly in a same orientation and fastened by the ring disposed on the saddle face, wherein:
   the element includes a recessed portion formed by depressing the saddle face at a corner between a side face of the neck portion and the saddle face,
   an inner face of the recessed portion includes a first inner face that extends from the side face of the neck portion to near a bottom portion of the recessed portion and having a first curvature radius, and a second inner face that extends from the first inner face toward the saddle face while forming the bottom portion and having a second curvature radius,
   the first curvature radius is larger than the second curvature radius, and
   the first inner face and the second inner face are concave.

6. The belt for a continuously variable transmission according to claim 5, wherein:
   the neck portion extends upwardly from the saddle face at an end of the element in a width direction, and
   an inner face of the neck portion faces a center of the element in the width direction.

7. The belt for a continuously variable transmission according to claim 6, wherein
   a stopper portion extends from the neck portion towards the center of the element in the width direction to cover a width-end portion of the saddle face.

8. The belt for a continuously variable transmission according to claim 5, wherein
   the second inner face is connected to the saddle face through a convex curve.

* * * * *

UNITED STATES PATENT AND TRADEMARK OFFICE
CERTIFICATE OF CORRECTION

PATENT NO. : 8,100,798 B2
APPLICATION NO. : 12/866782
DATED : January 24, 2012
INVENTOR(S) : Hideyuki Nishimi et al.

It is certified that error appears in the above-identified patent and that said Letters Patent is hereby corrected as shown below:

On the title page, Item (73), the Assignee's name is incorrect. Item (73) should read:

-- (73) Assignee: Toyota Jidosha Kabushiki Kaisha,
　　　　　　　　　Toyota-shi (JP) --

Signed and Sealed this
Twentieth Day of March, 2012

David J. Kappos
*Director of the United States Patent and Trademark Office*